United States Patent [19]

Vieira et al.

[11] Patent Number: 5,073,448
[45] Date of Patent: Dec. 17, 1991

[54] RECORDING MATERIALS FOR INK-JET PRINTING

[75] Inventors: Eric Vieira; Hugh S. Laver, both of Fribourg, Switzerland

[73] Assignee: Ciba-Geigy Corporation, Ardsley, N.Y.

[21] Appl. No.: 450,135

[22] Filed: Dec. 12, 1989

[30] Foreign Application Priority Data

Dec. 14, 1988 [CH] Switzerland .......................... 4623/88
Jun. 9, 1989 [CH] Switzerland .......................... 2172/89

[51] Int. Cl.$^5$ .............................................. B41M 5/00
[52] U.S. Cl. .................................. 428/331; 346/135.1; 428/195; 428/211; 428/520
[58] Field of Search ...................... 346/135.1; 428/195, 428/211, 331, 520

[56] References Cited

FOREIGN PATENT DOCUMENTS 312711 12/1982 Fed. Rep. of Germany .
008684 1/1983 Japan .
2088777 6/1982 United Kingdom .

OTHER PUBLICATIONS

Patent Abstracts of Japan, vol. 7, No. 81, Abstract No. 54 (1983).
C.A. 98(10) 91311q for JP 57/74,192.
C.A. 107(4):31301f for JP 61/230,975.

*Primary Examiner*—Pamela R. Schwartz
*Attorney, Agent, or Firm*—JoAnn Villamizar

[57] ABSTRACT

Recording materials for ink jet printing containing, as a stabilizer, at least one compound of the formula I

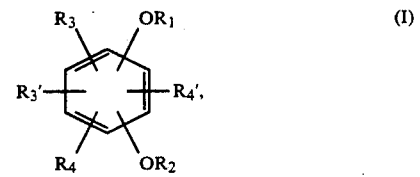

The symbols $R_1$, $R_2$, $R_3$, $R_3'$ $R_4$ and $R_4'$ are as defined in claim 1.

13 Claims, No Drawings

RECORDING MATERIALS FOR INK-JET PRINTING

The present invention relates to recording materials for ink jet printing which contain hydroquinone derivatives as a stabilizer.

Printing by means of ink jets is a printing process which can be controlled by electrical signals. In this process a fine jet of ink droplets is sprayed onto the recording material through a nozzle. The ink is in most cases an aqueous solution of a dye. The recording material should absorb the dye in the ink rapidly and permanently. Specially prepared paper or plastic films provided with a dye-binding layer are mostly used for this purpose. Owing to the fineness of the nozzles, pigments are hardly used, but dyes which are completely dissolved in the medium of the ink jet are mainly used. However, these dyes generally have a poorer fastness to light than the coloured pigments customary in conventional printing inks. As a result of this, the recordings prepared by ink jet printing have only a limited storage life under the action of light. If they are stored under light for a prolonged period, they begin to fade or discolour.

It has now been found that certain hydroquinone derivatives are particularly suitable for stabilizing recording materials for ink jet printing.

Hydroquinone derivatives are already known as an additive for recording materials for ink jet printing. Thus, for example, GB-A 2,088,777 describes, inter alia, dihydroxybenzenes which are substituted by —COOH, —SO$_3$H or dialkyl, and also phosphate derivatives of dialkyldihydroxybenzenes. Furthermore, dihydroxybenzenes and trihydroxybenzenes are described, for example, in JP-A 58-08,684. 2,2'-Dihydroxy-4-methoxybenzophenone is known, for example, from JP-A-61-230,975. Dialkylhydroquinones are described in JP-A-57 74,192 as suitable light stabilizers for recording materials in ink jet printing.

DE-A 3,121,711 describes, inter alia, hydroxybenzenes which carry 1, 2 or 3 hydroxyl groups and are unsubstituted or substituted by 1 or 2 —COOH or —COO—alkyl groups, for example tannin, gallic acid and the methyl, ethyl or propyl esters of gallic acid. The compounds mentioned are applied in the form of liquid preparations to the carrier material as a coating in order subsequently to afford coloured complexes with solutions of transition metal salts. In this case, therefore, the hydroxy compounds are actively involved in the formation of colour and do not act as stabilizers. The coated carrier material can also be used for the ink jet printing process.

There still remains a need for effective light stabilizers for the recording material in ink jet printing.

The present invention therefore relates to a recording material for ink jet printing containing, as a stabilizer, at least one compound of the formula I

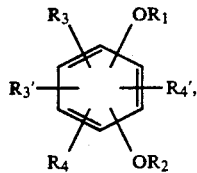

(I)

in which $R_1$ and $R_2$ independently of one another are $C_1$-$C_4$alkyl which is unsubstituted or substituted by one or 2 —OH, —COO$^\ominus$M$^\oplus$ and/or —SO$_3^\ominus$M$^\oplus$ groups, $C_3$-$C_5$alkenyl, $C_3$-$C_5$alkynyl,

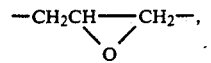

—CH$_2$CH(OH)CH$_2$—SO$_3^\ominus$M$^\oplus$, —CO—alkyl(C$_1$-C$_4$) which is unsubstituted or substituted by —COOR$^o$ or —CO—N(R$_5$)(R$_6$) or, if OR$_1$ and OR$_2$ are in the ortho-position relative to one another, $R_1$ and $R_2$ together are $C_1$-$C_6$alkylene, M$^\oplus$ being H$^\oplus$, a monovalent, divalent or trivalent metal cation or a group $(R_{12}')N^\oplus(R_{12}'')(R_{13}')(R_{14}')$, wherein $R_{12}'$, $R_{12}''$, $R_{13}$ and $R_{14}$ independently of one another are H, $C_1$-$C_4$alkyl, which is unsubstituted or substituted by 1 or 3 OH or optionally interrupted by O, alkyl, cyclopentyl, cyclohexyl, phenyl, benzyl or tolyl, or $R_1$ can also be a group

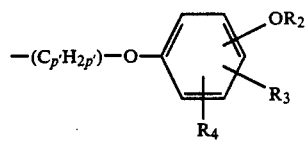

in which p' is a number from 2 to 6, $R_5$ and $R_6$ independently of one another are H or $C_1$-$C_4$alkyl which is unsubstituted or substituted by an OH, COOR$^o$, —COO$^\ominus$M$^\oplus$, SO$_3$R$^o$, SO$_3^\ominus$M$^\oplus$, P(O)(O$^\ominus$M$^\oplus$)$_2$ or P(O)(OR$^o$)$_2$ group, $R_3'$ and $R_4'$ independently of one another are H, $C_1$-$C_4$alkyl, OH or $C_1$-$C_4$alkoxy, $R_3'$ and $R_4'$ independently of one another are H, halogen, —OR$_7$, —COOR$^o$, —COO$^\ominus$M$^\oplus$, —OOC—R$_5$, —CO—N(R$_5$)(R$_6$), —(R$_5$)N—CO—R$_6$, —CO—R$_5$, —SO$_3^\ominus$M$^\oplus$, —SO$_2$N(R$_5$)(R$_6$), —P(OR$_5$)$_3$, —(O)P-(O$^\ominus$M$^\oplus$)$_2$, —(O)P—OR$^o$)$_2$, $C_1$-$C_8$alkyl which is unsubstituted or substituted by 1 to 7 —OR$_5$ or —OOC—R$_5$ groups, by 1 or 2 —COOR$^o$, —COO$^\ominus$M$^\oplus$, or —CO—N(R$_5$)(R$_6$) groups or by one or two —SO$_3^\ominus$M$^\oplus$, —SO$_2$N(R$_5$)(R$_6$) or —(O)P-(-OR$^o$)$_2$ or —(O)P(O$^\ominus$M$^\oplus$)$_2$ groups, where M$^\oplus$, R$_5$ and R$_6$ are as defined above, C$_5$-C$_6$cycloalkyl, R$^o$ being C$_1$-C$_4$alkyl which is unsubstituted or substituted by an —OH group or —(-CH$_2$CH$_2$O-)$_r$H in which r is 1 to 12, and R$_7$ being C$_1$-C$_4$alkyl or —CO—alkyl(C$_1$-C$_4$) each of which is unsubstituted or substituted by 1 or 2 —OH groups or R$_3$ and R$_4$ independently of one another are one of the groups of the formulae II-IV

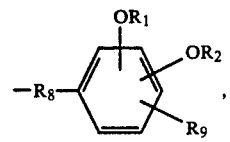

(II)

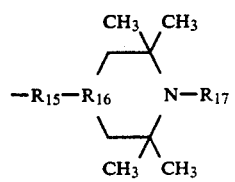

(III)

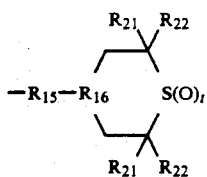 (IV)

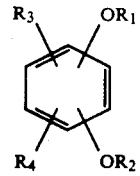 (I')

in which $R_8$ is a direct bond or methylene, $R_9$ is H, $C_1$-$C_8$alkyl, —COO$^\ominus$M$^\oplus$ or —SO$_3^\ominus$M$^\oplus$, where M$^\oplus$, $R_1$ and $R_2$ are as defined above, $R_{15}$ is —CO—, $(O)_g$ $C_pH_{2p}$—CO—, —OOC—$C_pH_{2p}$—, —COO—$C_pH_{2p}$—, —O—CH$_2$CH(OH)—CH$_2$— or

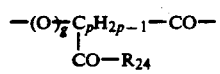

in which $R_{24}$ is —OR$_5$, —N(R$_5$)(R$_6$) or a group

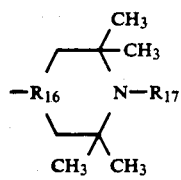

and $R_{16}$ is one of the following radicals:

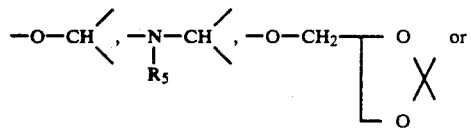

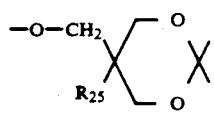

in which $R_{25}$ is H or $C_1$-$C_4$alkyl, $R_{17}$ is H, $C_1$-$C_4$alkyl which is unsubstituted or substituted by an —OH group, —CH$_2$—CH(OH)—CH$_2$—OH, $C_1$-$C_4$-alkoxy, —OH, —CO—alkyl($C_1$-$C_4$), allyl, benzyl or a group

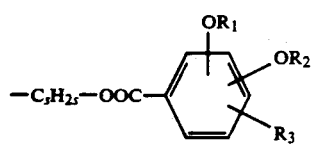

in which s is the number 2 or 3, t is a number from 0 to 2 and $R_{21}$ and $R_{22}$ independently of one another are $C_1$-$C_4$alkyl or phenyl.

Recording materials which should be singled out are those containing, as a stabilizer, at least one compound of the formula I' in which $R_1$ and $R_2$ independently of one another are $C_1$-$C_4$alkyl which is unsubstituted or substituted by one or 2 —OH, —COO$^\ominus$M$^\oplus$ and/or —SO$_3^\ominus$M$^\oplus$ groups, —CH$_2$CH(OH)CH$_2$—SO$_3^\ominus$M$^\oplus$ or —CO—alkyl(-$C_1$-$C_4$), or in which M$^\oplus$ is H$^\oplus$, a monovalent, divalent or trivalent metal cation or a group (R$_{12}'$)N$^\oplus$(R$_{12}''$)(R$_{13}'$)(R$_{14}'$), $R_5$ and $R_6$ independently of one another are H or $C_1$-$C_4$alkyl which is unsubstituted or substituted by one OH group, $R_3$ and $R_4$ independently of one another are H, halogen, —OR$_7$, —COOR$^o$, —COO$^\ominus$M$^\oplus$, —OOC—R$_5$, —CO—N(R$_5$)(R$_6$), —(R$_5$)N—CO—R$_6$, —CO—R$_5$, —SO$_3^\ominus$M$^\oplus$, —SO$_2$N(R$_5$)(R$_6$), —P(OR$_5$)$_3$, —(O)-P-(OR$^o$)$_2$, —(O)P(O$^\ominus$M$^\oplus$)$_2$, $C_1$-$C_8$alkyl which is unsubstituted or substituted by 1 to 7 —OR$_5$ or —OOC—R$_5$ groups, by 1 or 2 —COOR$^o$, COO$^\ominus$M$^\oplus$ or —CO—N(R$_5$)(R$_6$) groups or by an —SO$_3^\ominus$M$^\oplus$, SO$_2$N(R$_5$)(R$_6$) or —(O)P(O$^\ominus$M$^\oplus$)$_2$ or —(O)P-(OR$^o$)$_2$ group, where M$^\oplus$, $R_5$ and $R_6$ are as defined above, R$^o$ being $C_1$-$C_4$alkyl which is unsubstituted or substituted by an —OH group, or is -(CH$_2$CH$_2$O-)$_r$H in which r is 1 to 12, $R_7$ is $C_1$-$C_4$alkyl which is unsubstituted or substituted by 1 or 2 —OH groups, or $R_3$ and $R_4$ independently of one another are one of the groups of the formulae

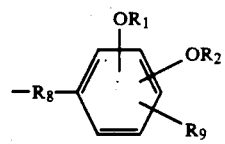 (II)

in which $R_8$ is a direct bond or methylene, $R_9$ is H, $C_1$-$C_8$alkyl, COO$^\ominus$M$^\oplus$ or —SO$_3^\ominus$M$^\oplus$, and $R_1$ and $R_2$ are as defined above.

Recording materials which are also preferred are those in which independently of one another are $C_1$-$C_4$alkyl, allyl, $C_2$-$C_4$hydroxyalkyl, —$C_1$-$C_4$alkyl—COO$^\ominus$M$^\oplus$, —CH$_2$CH(OH)CH$_2$—SO$_3^\ominus$M$^\oplus$ or —CO—alkyl($C_1$-$C_4$) or wherein $R_1$ is a group of the formula

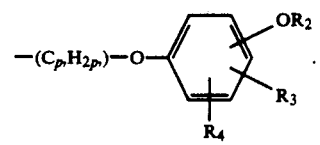

Recording materials of interest are those in which $R_3$ and $R_4$ independently of one another are H, halogen, —OR$_7$, —COOR$^o$, —COO$^\ominus$M$^\oplus$, —CO—N(R$_5$)(R$_6$), —CO—NH—OH, —CO—R$_5$, —SO$_3^\ominus$M$^\oplus$, —SO$_2$N(R$_5$)(R$_6$), $C_1$-$C_8$alkyl which is unsubstituted or substituted by 1 or 2 —COOR$^o$ or —CO—N(R$_5$)(R$_6$) groups or by an —SO$_3^\ominus$M$^\oplus$, —SO$_2$N(R$_5$)(R$_6$), —(O)P-(O$^\ominus$M$^\oplus$)$_2$ or —(O)P—(OR$^o$)$_2$ group, or $C_2$-$C_5$alkenyl which is unsubstituted or substituted by 1 or 2

—COOR$^o$, —COO$^\ominus$M$^\oplus$, —CO—N(R$_5$)(R$_6$), —CO—R$_5$ or —C≡N groups.

Recording materials of particular interest are those in which R$_3$ and R$_4$ independently of one another are H, halogen, —OR$_7$, —COOR$^o$, —COO$^\ominus$M$^\oplus$, —CO—N(R$_5$)(R$_6$), —SO$_3^\ominus$M$^\oplus$, —SO$_2$N(R$_5$)(R$_6$), C$_1$-C$_8$alkyl which is substituted by —COO$^\ominus$M$^\oplus$ or allyl.

Recording materials of interest are also those in which R$_3$ and/or R$_4$ are the radical —OR$_7$, R$_7$ being C$_1$-C$_4$alkyl, C$_2$-C$_4$hydroxyalkyl or —CH$_2$—CH(OH)CH$_2$—OH.

Preferred recording materials are also those in which R$_1$ and R$_2$ are CH$_3$ and R$_3$ is —COO$^\ominus$M$^\oplus$ and R$_4$ is methoxy.

Recording materials which merit particular mention are also those in which R$_1$ and R$_2$ independently of one another are C$_1$-C$_4$alkyl or C$_1$-C$_4$alkyl which is substituted by carboxyl, or R$_1$ and R$_2$ together are C$_1$-C$_4$alkylene, R$_3$ and R$_4$ independently of one another are H, COOR$^o$, —COO$^\ominus$M$^\oplus$, C$_1$-C$_4$alkoxy, C$_1$-C$_4$alkyl—COOR$^o$, C$_1$-C$_4$-alkyl-COO$^\ominus$M$^\oplus$, C$_1$-C$_4$alkyl or SO$_3^\ominus$M$^\oplus$ and R$_3'$ and R$_4'$ independently of one another are H or C$_1$-C$_4$alkoxy.

Examples of possible C$_1$-C$_4$alkyl radicals are methyl, ethyl, n-propyl, isopropyl, n-butyl, sec-butyl or t-butyl.

In addition to the meanings mentioned, examles of possible C$_1$-C$_8$alkyl radicals are n-pentyl, t-amyl, n-hexyl, n-heptyl, 2-ethylhexyl, n-octyl or 1,1,3,3-tetramethylbutyl.

Examples of possible C$_1$-C$_4$hydroxyalkyl radicals are hydroxyethyl, 2-hydroxyethyl, 1-hydroxyethyl, 3-hydroxypropyl, 3-hydroxybutyl or 4-hydroxybutyl.

In addition to the meanings of C$_1$-C$_4$hydroxyalkyl, examples of possible C$_1$-C$_8$alkyl radicals which are unsubstituted or substituted by 1 to 3 OH groups are 2,3-dihydroxypropyl, 2,2-di(hydroxymethyl)-propyl, 6-hydroxyhexyl, 8-hydroxyoctyl, 1,2,4-trihydroxybut-2-yl, 1,2,6-trihydroxyhex-2-yl and 1,2,3-trihydroxyprop-2-yl.

Examples of possible C$_2$-C$_6$alkylene radicals are ethylene, ethylidene, tri-, tetra-, penta- or hexa-methylene, 1,2-propylene, 2,2-propylidene, 2,2-butylidene, 1,2-butylene or 2,2-dimethyl-1,3-propylene.

In addition to the preceding meanings, possible C$_1$-C$_4$alkylene radicals can also be methylene.

Possible alkylene radicals which are interrupted by 1 or more —O— or —N(R$_5$)— are radicals in which there are at least 2 C atoms between 2 hetero atoms.

Examples of possible C$_2$-C$_5$alkenyl radicals are vinyl, allyl, methallyl, propen-1-yl, buten-1-yl or penten-1-yl.

As C$_2$-C$_5$alkenyl which is substituted or unsubstituted, R$_3$ and R$_4$ can, for example, have the following formula

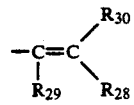

in which R$_{28}$ is H or CH$_3$ and R$_{29}$ and R$_{30}$ independently of one another are —COOR$^o$, —COO$^\ominus$M$^\oplus$, —CO—CH$_3$, —CON(R$_5$)(R$_6$) or —C≡N.

As halogen, R$_3$ and R$_4$ can, for example, be Cl, Br or I.

Possible C$_5$-C$_6$cycloalkyl radicals or C$_5$-C$_7$cycloalkyl radicals can, for example, be cyclopentyl, cyclopentenyl, cyclohexyl, cyclohexenyl or cycloheptyl, preferably cyclohexyl.

Possible monovalent, divalent or trivalent metal cations can, for example, be alkali metal cations, such as Na$^+$ or K$^+$ and especially Li$^+$, alkaline earth metal cations, such as Mg$^{2+}$ and especially Ca$^{2+}$, and also Al$^{3+}$, Mn$^{2+}$, Fe$^{2+}$, Co$^{2+}$, Ni$^{2+}$, Cr$^{2+}$ and especially Zn$^{2+}$.

In the substituent M$^\oplus$ the radicals R$_{12}'$, R$_{12}''$, R$_{13}'$ and R$_{14}'$ are independently of each other H, C$_1$-C$_4$alkyl, which is optionally substituted by 1 to 3 OH groups or is optionally interrupted by an O atom, allyl, cyclopentyl or cyclohexyl, phenyl, benzyl or tolyl.

As HN$^\oplus$R$_{12}'$R$_{12}''$R$_{13}'$, M$^\oplus$ may denote NH$_4$, HN(CH$_3$)$_3$, HN(CH$_2$CH$_3$)$_2$, H$_3$NCH$_2$CH$_2$OH, H$_2$N(CH$_2$CH$_2$OH)$_2$ or HN(CH$_2$CH$_2$OH)$_3$.

X$^\ominus$ can, for example, be F$^-$, Cl$^-$, Br$^-$, I$^-$, R$_o$—SO$_3^-$, C$_1$-C$_4$alkyl—OSO$_3^-$, CN$^-$, SCN$^-$, OH$^-$, BF$_4^-$, PF$_6^-$, HCO$_3^-$, H$_2$PO$_3^-$, H$_2$PO$_4^-$, R$_{25}$—COO$^-$, ½ CO$_3^{2-}$, ½ SO$_4^{2-}$, ½ HPO$_3^{2-}$, ½ HPO$_4^{2-}$, ½ R$_{27}$—(COO$^-$)$_2$, ⅓ PO$_4^{3-}$ ⅓ PO$_3^{3-}$ or

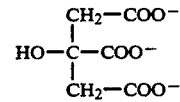

R$^o$ is C$_1$-C$_4$alkyl which is unsubstituted or substituted by OH.

X$^\ominus$ is particularly preferably Cl$^-$, CH$_3$—OSO$_3^-$, CH$_3$CH$_2$—OSO$_3^-$, CH$_3$SO$_3^-$,

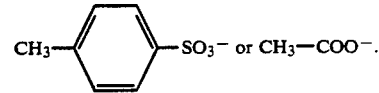

The compounds of the formula I are in part known and are partly commercially available or can be prepared by known methods.

The recording materials according to the invention are distinguished by an unexpected improvement in quality. In particular, their resistance to oxidation by influence of light or heat should be mentioned. In this respect, they are superior relative to corresponding recording materials which contain polyhydroxybenzene derivatives as stabilizers. These stabilizers are not efficient enough to suppress yellowing of the print. Contrary to this, the inventive materials practically do not show such yellowing.

The recording materials for ink jet printing consist of a carrier having a surface which can be printed by ink jets. The carrier is usually paper or a plastic film and is normally coated on one side with a material which is particularly absorbent for inks. Preferably this coating contains SiO$_2$ and polyvinylalcohol.

Uncoated paper can also be employed for ink jet printing. In this case the paper acts at the same time as a carrier material and as an ink-absorbent layer. Further, materials can be used in ink-jet printing which essentially consist of cellulose fibres or textile, fibre materials, for example cotton fibres or mixtures of cotton and polyacrylamide or polyester, which contain the compounds of the formula I.

The recording material can also be transparent, as in the case of projection films.

The compounds of the formula I can be incorporated into the carrier material as early as the preparation of the latter, for example by being added to the paper pulp when paper is prepared. A second method of application is spraying the carrier material with a solution of the compounds of the formula I. The solution is an aqueous solution or a solution in a readily volatile organic solvent.

In most cases, however, a dye-affinitive layer is applied to the carrier material, and in this case the compounds of the formula I are added to this coating composition. The coating compositions usually consist of a solid filler and a binder and also minor amounts of additives.

The filler is the main constituent of the coating composition in terms of quantity. Examples of suitable fillers are silica ($SiO_2$), kaolin, talc, clay, Ca, Mg or Al silicates, gypsum, zeolite, bentonite, diatomaceous earth, vermiculite, starch or the surface-modified silica described in JP-A 60-260,377. Small amounts of white pigments, for example titanium dioxide, barytes, magnesium oxide, limestone, chalk or magnesium carbonate can be used together with the filler in the coating composition, provided that they do not reduce the density of the ink jet print too greatly.

Coating compositions intended for transparent recording materials suitable for projection cannot contain any particles which scatter light, such as pigments and fillers.

The binder binds the fillers to each other and to the carrier material. Examples of customary binders are water-soluble polymers, for example polyvinyl alcohol, partially hydrolysed polyvinyl acetate, cellulose ethers, polyvinylpyrrolidone and copolymers thereof, polyethylene oxide, salts of polyacrylic acid, sodium alginate, oxidized starch, gelatine, casein, vegetable gum, dextrin, albumin, dispersions of polyacrylates or acrylate/-methacrylate copolymers, latices of natural or synthetic rubber, poly(meth)acrylamide, polyvinyl ethers, polyvinyl esters, copolymers of maleic acid, melamine resins, urea resins or chemically modified polyvinyl alcohols, as described in JP-A 61 134,290 or 61-134,291.

An additional dye receptor or mordant which fix the dye more firmly on the coating can be added to the binder. Dye receptors for acid dyes are of cationic or amphoteric nature. Examples of cationic receptors are polymeric ammonium compounds, for example polyvinylbenzyltrimethylammonium chloride, polydiallyldimethylammonium chloride, polymethacryloxyethyldimethylhydroxyethylammonium chloride, polyvinylbenzylmethylimidazolium chloride, polyvinylbenzylpicolinium chloride or polyvinylbenzyltributylammonium chloride. Further examples are basic polymers, for example poly-(di-methylaminoethyl) methacrylate, polyalkylenepolyamines and condensation products thereof with dicyandiamide, amine-epichlorohydrin polycondensates or the compounds described in JP-A 57-36,692, 57-64,591, 57-187,289, 57-191,284, 58-177,390, 58-208,357, 59-20,696, 59-33,176, 59-96,987, 59-198,188, 60-49,990, 60-71,796, 60-72,785, 60-161,188, 60-187,582, 60-189,481, 60-189,482, 61-14,979, 61-43,593, 61-57,379, 61-57,380, 61-58,788, 61-61,887, 61-63,477, 61-72,581, 61-95,977 or 61-134,291 or in U.S. Pat. Nos. 4,547,405 and 4,554,181 and in DE-A 3,417,582. An example of amphoteric dye receptors is gelatine.

The dye-binding coating can contain a number of further additives, for example antioxidants, light stabilizers (including also UV absorbers which do not correspond to the light stabilizers according to the invention), viscosity improvers, fluorescent brighteners, biocides and/or antistatic agents.

Examples of suitable antioxidants are, in particular, sterically hindered phenols and hydroquinones, for example the antioxidants listed in GB-A 2,088,777 or JP-A 60-72,785, 60-72,786 and 60-71,796.

Examples of suitable light stabilizers are, in particular, organic nickel compounds and sterically hindered amines, for example the light stabilizers mentioned in JP-A 58-152,072, 61-146,591, 61-163,886, 60-72,785 and 61-146,591 or those mentioned in GB-A 2,088,777 or JP 59-169,883 and 61-177,279.

It is particularly advantageous to add UV absorbers to the coating composition for ink jet printing containing the compounds of the formula I. Examples of UV absorbers suitable for this purpose are described in Research Disclosure No. 24,239 (1984) page 284, GB-A 2,088,777 and EP-A 0,280,650. The UV absorbers of the 2-hydroxyphenylbenzotriazole class are particularly suitable for use together with compounds of the formula I in recording materials for ink jet printing, very particularly 2-(2'-hydroxy-3',5'-di-t-amylphenyl)-benzotriazole. The UV absorbers can be added to the coating composition in the form of an emulsion or dispersion.

It is preferable to use aqueous coating compositions. In this case the stabilizers of the formula I and the other additives must be dispersed as homogeneously as possible in the coating composition. If the stabilizer is liquid, it can be dispersed directly in the binder or in the coating composition after surface-active agents have been added. If the stabilizer is solid or viscous, it is advisable to dissolve it in an organic solvent and to disperse this solution in the coating composition.

However, many of the compounds of the formula I are water-soluble and are therefore particularly advantageous, since they can be dissolved without further treatment in the coating composition, which is in most cases aqueous. Compounds containing —OH, —COOH or —$SO_3H$ groups can best be dissolved without further treatment in the coating composition by adding a suitable alkali metal hydroxide solution. Compounds containing non-quaternary amino groups can also be dissolved in a similar manner without further treatment in the coating composition by adding an acid.

It is preferable to use a solvent of low volatility as the solvent for additives which are not water-soluble, in order that the stabilizer may remain in the liquid state even after prolonged storage of the recording material. In most cases, however, a volatile solubilizer is also added to prepare the dispersions, and this is removed again during the process of preparing the recording material. Examples of solvents of low volatility are organic liquids having an oily character and a high boiling point, for example phthalic acid esters (for example dimethyl, diethyl, dibutyl, diamyl, dihexyl, diheptyl, dioctyl, dinonyl or didecyl phthalate or dibutyl chlorophthalate), glycolic acid esters (for example butylphthalylbutyl glycolate), phenols (for example 2,4-di-n-amylphenol or 2,4-di-tert-amylphenol), phosphoric acid esters (for example diphenyl, triphenyl, tricresyl, cresyl diphenyl, dioctyl, dioctyl butyl, trioctyl, tridecyl, trixylenyl, tri-(isopropylphenyl), tributyl, trihexyl, trinonyl, trioleyl or tri-(butoxyethyl) phosphate), citric acid esters (for example O-acetyl-triethyl, -tributyl, -trihexyl, -trioctyl, -trinonyl or -tridecyl citrate), benzoic acid esters (for example butyl, hexyl, heptyl, octyl, nonyl, decyl, undecyl, dodecyl, tetradecyl, octadecyl or oleyl benzoate), esters of substituted benzoic acids (for example butyl 2-methoxybenzoate, pentyl o-methylbenzoate, decyl p-methylbenzoate, lauryl o-chlorobenzoate, propyl 2,4-dichlorobenzoate, oleyl 2,4-dichlorobenzoate or octyl p-methoxybenzoate), fatty acid esters and dicarboxylic acid esters (for example hexadecyl myristate, dibutyl sebacate, dibutoxyethyl succinate, dioctyl adipate, dioctyl azelate or benzyl caprylate), esters of polyols (for example decamethylene glycol diacetate, triacetylglycerol, tributyroylglycerol, pentraerythritol tetracapronate or isosorbitol dicaprylate), fatty acid amides (for example N,N-dimethyl-, N,N-diethyl- or N,N-dibutyl-laurylamide), chlorinated paraffins, aliphatic or aliphatic-aromatic ethers, (for example glycerol trialkyl ethers, glycerol 1,3-dialkyl ethers, N-pentadecyl phenyl ether or 3-pentadecyl phenylethyl ether), alkyl arylcarbamates (for example ethyl N,N-diphenylcarbamate) or mixtures of such liquids.

Liquids boiling not higher than 150° C. can be used as volatile solvents. Examples of these are lower alkyl acetates or propionates (for example methyl, ethyl, n-propyl, isopropyl or butyl acetate, or methyl or ethyl propionate), ethyl formate or diethyl carbonate, lower chloroalkanes (for example carbon tetrachloride, dichloroethylene, trichloroethylene, 1,2-dichloropropane, chloroform or amyl chloride), ketones (for example acetone, methyl ethyl ketone, diethyl ketone or methyl isobutyl ketone), ethers (for example diisopropyl ether, dibutyl ether, tetrahydrofuran or dioxane), alcohols (for example methanol, ethanol, isopropanol or butanol), monoethers of diols (for example ethyleneglycol monomethyl ether or monoethyl ether), hydrocarbons (for example cyclohexane, methylcyclohexane, ligroin, benzene, toluene or xylene), nitromethane, acetonitrile, dimethyl sulfoxide, N-methylpyrrolidone, dimethylformamide, tetrahydrothiophene dioxide, butyrolactone or 1,2-dimethoxyethane.

These solubilizers serve to improve the dispersion of the stabilizer or a solution thereof in the high-boiling solvent. If, however, the stabilizer is a liquid of low viscosity which can be dispersed readily by virtue of a polar or hydrophilic character, no solvent is necessary. This is the case with many of the stabilizers used in accordance with the invention. This makes it possible to simplify the preparation of the emulsions; recovery of the solubilizer is superfluous.

If a solubilizer is used, it must be removed again before the coating process. This can be effected by heating and/or by vacuum treatment, for example in a vacuum spray evaporator or a vacuum rotary evaporator.

If the binder in the coating composition is an aqueous solution, a dispersion or a latex, the oily phase of the stabilizer or a solution thereof is preferably dispersed homogeneously in the aqueous phase and this dispersion should have as long a pot life as possible, during which the dispersed oil droplets do not increase in size nor does the dispersion separate out. This is possible—apart from the use of solvents—by using surface-active agents, by adding colloids to the aqueous phase and by suitably vigorous mixing and dispersing machines.

Examples of suitable dispersing machines are ultrasonic equipment, turbine stirrers, homogenizers, colloid mills, bead mills, sand mills or high-speed stirrers.

Examples of colloids which are added to the aqueous phase and stabilize the dispersions formed are polyvinyl alcohol, cellulose ethers, polyethylene oxide, salts of polyacrylic acid, gelatine, vegetable gum, dextrin, casein or albumin. These colloids are at the same time also binders.

Examples of surface-active dispersion auxiliaries can be nonionic, amphoteric, anionic or cationic surfactants. Examples of nonionic surfactants are esters or ethers of polyethylene oxides or polypropylene oxides or copolymers thereof, fatty acid alkanolamides, ethoxylated alkanolamides, partial fatty acid esters of polyols (for example of glycerol, polyglycerol, sorbitol, pentaerythritol or sucrose), N-alkylmorpholines or long-chain amine oxides.

Examples of amphoteric surfactants are fatty acid amidoalkylbetaines, fatty acid amidoalkylsultaines, fatty acid imidazolinebetaines, N-alkyl-$\beta$-aminopropionic acids or alkylene bis-(amidoalkylglycinates).

Examples of anionic surfactants are alkali metal or ammonium salts of fatty acids, of alkylsulfates, of amidoethylene oxide-sulfates, of alkylsulfonic or alkylarylsulfonic acids, of N-alkyltaurines and N-acyltaurines, of fatty acid isethionates, of alkylsulfosuccinates, of ligninsulfonates, of petroleum sulfonates, of monoalkyl or dialkyl phosphates, of N-alkylsarcosines, of alkylsulfonamidoacetic acids, of alkyllactates, of monoalkylsuccinates, of fatty acid protein condensation products, of (alkyl)naphthenic acids, of abietic acids, of sulfonated fatty acids or of N-acylaminocarboxylic acids.

Examples of cationic surfactants which can also serve as mordants for the dyes in the ink are the quaternary ammonium salts of long-chain fatty amines and benzylamines, imidazolinium, pyridinium, picolinium or morpholinium salts having long-chain alkyl radicals, quaternary ammonium salts of long-chain alkylamidoalkylamines or bis-ammonium salts of quaternary diamines.

If the binder is applied to the coating composition in the form of a solution in an organic solvent, the light stabilizers and the other additives do not need to be dispersed. They are then added directly to the binder solution or they are previously dissolved in an organic solvent.

As a rule, the coating composition is applied to the carrier, which is paper in most cases, and is dried by heating. As already mentioned, the compounds of the formula I can also be applied to the recording material in the form of an aqueous solution in a separate operation, on their own or together with other components already described. Application can be effected by spraying, bonding in a bonding press, by a separate pouring process or by immersion in a tub. An additional drying process is, of course, necessary after such an after-treatment of the recording material.

The recording material preferably contains 1 to 10,000 mg/m$^2$, in particular 50–2,000 mg/m$^2$, of at least one compound of the formula I.

The nature of the ink and of the dye dissolved in it and the nature of the printer used are of no importance for the recording materials according to the invention.

In the printers used nowadays, a distinction is drawn between those having a continuous ink jet and "drop-on-demand" printers, in particular bubble-jet printers. The recording material according to the invention can be used for processes based on all these types of apparatus.

The inks are in most cases aqueous inks, but they can also be solutions of the dye in an organic solvent or in a melted wax. In most cases aqueous inks also contain water-soluble organic solvents, for example mono-, di- or tri-ethylene glycols or higher ethylene glycols, propylene glycol, 1,4-butanediol or ethers of such glycols, thiodiglycol, glycerol and ethers and esters thereof, polyglycerol, mono-, di- and tri-ethanolamine, propanolamine, dimethylformamide, dimethyl sulfoxide, dimethylacetamide, N-methylpyrrolidone, 1,3-dimethylimidazolidone, methanol, ethanol, isopropanol, n-propanol, diacetone alcohol, acetone, methyl ethyl ketone or propylene carbonate.

Aqueous inks contain water-soluble dyes, such as are also known for dyeing natural fibres. These can be, for example, monoazo, disazo or polyazo dyes, reactive dyes, triphenylmethane dyes, xanthene dyes or phthalocyanine dyes. Examples of these are C.I. Food Black 2, C.I. Direct Black 19, C.I. Direct Black 38, C.I. Direct Black 168, C.I. Sulphur Black 1, C.I. Acid Red 35, C.I. Acid Red 249, C.I. Direct Red 227, C.I. Acid Yellow 23, C.I. Direct Yellow 86, C.I. Acid Blue 9, C.I. Direct Blue 86 or C.I. Direct Blue 199, C.I. Acid Red 14, C.I. Acid Red 52, C.I. Reactive Red 50, C.I. Direct Yellow 107 and C.I. Direct Black 154.

Aqueous inks can also contain various additives in minor amounts, for example binders, surfactants, biocides, corrosion inhibitors, sequestering agents, pH buffers or conductivity additives. They can also contain anionic, water-soluble UV absorbers or other water-soluble light stabilizers. In general, however, the addition, in accordance with the invention, of a light stabilizer to the recording material is adequate.

If the ink is a nonaqueous ink, it is a solution of the dye in an organic solvent or solvent mixture. Examples of solvents used for this purpose are alkylcarbitols, alkylcellosolves, dialkylformamides, dialkylacetamides, alcohols, in particular alcohols having 1–4 C atoms, acetone, methyl ethyl ketone, diethyl ketone, methyl isobutyl ketone, diisopropyl ketone, dibutyl ketone, dioxane, ethyl butyrate, ethyl isovalerate, diethyl malonate, diethyl succinate, methyl pelargonate, butyl acetate, triethyl phosphate, ethylglycol acetate, toluene, xylene, tetralin or petroleum fractions. Examples of solid waxes as solvents are stearic or palmitic acid.

Inks of this type based on solvents contain dyes soluble therein, for example Solvent Red, Solvent Yellow, Solvent Orange, Solvent Blue, Solvent Green, Solvent Violet, Solvent Brown or Solvent Black. Inks of this type can also contain further additives, such as are listed above for aqueous inks.

A particular problem of fastness to light can occur if one ink is sprayed on top of another in the course of ink jet printing, since in such cases the fastness to light of the printed mixed colour is frequently poorer than that of the individual inks. This problem occurs especially if Cu phthalocyanine dyes, such as Direct Blue 86 and Direct Blue 199, are used in combination with azo dyes, such as Acid Red 35, Acid Red 249 and Direct Red 227. This undesired effect can be largely suppressed by impregnating the carrier with the compounds of the formula I.

The compounds of the formula I can be prepared by processes known from the literature. Examples of starting materials are polyhydroxybenzenes, such as catechol, resorcinol, hydroquinone and pyrogallol derivatives. These can be carboxylated, for, example by reacting the corresponding phenates with $CO_2$, or this step is achieved by formylation and subsequent oxidation. Sulfonation with sulfuric acid or chlorosulfonic acid permits sulfonic acid groups to be introduced into the benzene ring. Carboxylalkyl groups can be introduced by alkylating the phenolic hydroxyl groups by using halogenocarboxylic acid esters, such as methyl chloroacetate, ethyl bromoacetate or methyl 3-bromopropionate, and also by means of olefinic alkylating agents, such as methyl or ethyl (meth)acrylate, dimethyl maleate or fumarate, or maleic or itaconic anhydride and the like, or by means of epoxy compounds, such as methyl 2,3-epoxypropionate or dimethyl 2,3-epoxysuccinate and saponification of the ester function. The use of halogenoalkylsulfonic, epoxyalkylsulfonic or olefin-alkylsulfonic acid derivatives, such as 3-bromo-2-hydroxypropanesulfonic acid, 3-chloropropanesulfonic acid, 2,3-epoxypropanesulfonic acid, an alkylsulfonic acid, a dimethylalkylsulfonic acid or sulfonic acid lactones, such as 1,3-propane sulfone, permits the direct introduction of sulfonyl groups. Allyl substituents can be attached directly to the benzene ring via the Claisen rearrangement of the corresponding allyl ethers. Further functional groups can then be added on to the double bond contained therein, for example by sulfonation, halogenation or epoxidation, followed by reaction with sodium sulfite or trialkyl phosphites, which is equivalent to a direct introduction of a sulfonic or phosphoric acid group. The phenolic hydroxyl groups can be alkylated by means of a large number of alkylating agents, for example alkyl, alkenyl or alkynyl halides, dialkyl sulfates or alkylphosphonic acid esters, that is to say, for example, by means of methyl iodide, ethyl bromide, propyl or butyl chloride, dimethyl and diethyl sulfate, an alkyl bromide, a dimethylalkyl bromide, propargyl bromide and the like. Quaternary ammonium groups can be obtained by quaternizing amines by using the abovementioned alkylating agents. Alkoxy groups can be introduced by halogenation and replacing the halogen atom with alcoholate. Monocarboxylic and polycarboxylic acid derivatives can be prepared, for example, by metallation of the corresponding monoalkoxybenzenes or polyalkoxybenzenes using, for example, an alkyllithium or Grignard reagent and subsequently reacting the product with $CO_2$.

The following examples illustrate the invention further. In these and in the rest of the description, parts and percentages are parts by weight and percentages by weight, unless otherwise stated.

EXAMPLE 1

Coating compositions based on silica/polyvinyl alcohol are prepared with and without stabilizers of the formula I. 0.2 g of a 10% solution of Invadin ® JFC wetting agent (Ciba-Geigy AG), 19 g of water and 0.22 g of a stabilizer of the formula I are added in each case to 16.4 g of a 10% solution of polyvinyl alcohol (Riedel de Haen GmbH). The mixture is stirred and heated until the stabilizer has dissolved. 2.0 g of silica (Syloid ® type 244, Grace and Co.) are then added and are dispersed by means of ultrasonic sound. The resulting coating composition is filtered through a sieve made of polyester fibres and having a mesh width of 24 μm. The pH is adjusted to 7.0 by adding 2N sodium hydroxide solution. The blank sample with no stabilizer contains 0.22 g of water instead of the same amount of stabilizer. The coating compositions are applied in a thickness of 50 μm to photographic paper by means of a wire spiral. The coating obtained after drying with hot air has a dry weight of about 5.3 $g/m^2$ (or 5.0 $g/m^2$ without stabilizer) and contains 0.3 $g/m^2$ of stabilizer.

Each of the recording materials thus prepared is printed with a yellow and a purple-red ink in a so-called "Think-jet" ink jet printing apparatus (Hewlett-Packard). The yellow ink contains:
5 parts of C.I. Acid Yellow 23,
50 parts of diethylene glycol and
45 parts of water.

A purple-red ink is prepared analogously, but using C.I. Acid Red 35. The inks are filtered through an ultra-filter of pore width 0.3 μm and are filled into the ink cartridges of the "Think-jet" apparatus. Printed samples having a dot density of 192×96 dots per inch$^2$ are produced.

After storage for one week, in order to dry out the inks completely, the ink density (intensity) of the printed samples is determined by means of a densitometer (Macbeth TR 924) using a Status A filter. The printed samples are then irradiated in an Atlas Weather-o-meter with a xenon lamp of a luminous density of 81 klux behind a filter of window glass 6 thick. The ink density is then measured again in order to determine the percentage loss in ink density.

The results are collated in Table 1 below. Lower values mean a higher fastness to light.

TABLE 1

| SAMPLE | STABILIZER | LOSS IN INK DENSITY (%) | |
|---|---|---|---|
| | | Acid Yellow 23 at 10 kJ/cm$^2$* | Acid Red 35 at 5 kJ/cm$^2$ |
| 1 | — | 56 | 89 |
| 2 | 2,3-Dimethoxy-benzoic acid | 29 | 30 |

*Amount of radiation energy within the 300-800 nm range measured

EXAMPLE 2

Fastness to light can also be imparted, by using compounds of the formula I, to ink jet printing papers containing mordants to increase their stability to water.

Coating compositions consisting of 14.2 g of a 10% solution of polyvinyl alcohol (Riedel de Haen GmbH), 0.2 g of a 10% solution of Invadin ® JFC (Ciba-Geigy AG), 0.4 g of Polyfix 601 ® as mordant (Showa High Polymer Co.), 0.22 g of a stabilizer of the formula I, 20.7 g of water and 2.0 g of silica are prepared as described in Example 1. The blank sample without stabilizer contains 0.22 g of water instead of the same amount of stabilizer. The coating compositions are poured onto a photographic paper carrier in accordance with Example 1, dried and printed with inks containing the dyes C.I. Acid Red 249, C.I. Acid Yellow 23 or C.I. Food Black 2. The preparation of these inks is carried out as indicated in Example 1. The results of testing the printed papers for fastness to light are collated in Tables 2 to 5 below.

TABLE 2

| SAM-PLE | STABILIZER | LOSS IN INK DENSITY (%) | |
|---|---|---|---|
| | | Acid Yellow 23 at 15 kJ/cm$^2$* | Acid Red 249 at 15 kJ/cm$^2$* |
| 1 | — | 68 | 69 |
| 2 | 2,5-Dimethoxybenzoic acid | 42 | 56 |
| 3 | 3,4,5-Trimethoxyphthalic acid | 49 | 60 |
| 4 | 3,4-Dimethoxybenzene-sulfonic acid | 54 | 64 |
| 5 | 2,3-Ethylenedioxybenzoic acid | 47 | 57 |
| 6 | 2,3-Isopropylidenedioxy-benzoic acid | 57 | 54 |

*Amount of radiation energy measured

TABLE 3

| SAM-PLE | STABILIZER | LOSS IN INK DENSITY (%) | |
|---|---|---|---|
| | | Acid Yellow 23 at 15 kJ/cm$^2$* | Acid Red 249 at 15 kJ/cm$^2$* |
| 1 | — | 74 | 76 |
| 2 | 2,3-Dimethoxybenzoic acid | 50 | 50 |
| 3 | 3,4-Dimethoxybenzoic acid | 44 | 51 |
| 4 | 3,5-Dimethoxybenzoic acid | 50 | 56 |
| 5 | 2,6-Dimethoxybenzoic acid | 59 | 57 |

*Amount of radiation energy measured

TABLE 4

| SAM-PLE | STABILIZER | LOSS IN INK DENSITY (%) | |
|---|---|---|---|
| | | Acid Yellow 23 at 15 kJ/cm$^2$* | Acid Red 249 at 15 kJ/cm$^2$* |
| 1 | — | 63 | 59 |
| 2 | 1,2,3-Trimethoxybenzoic acid | 53 | 41 |
| 3 | 2,4,5-Trimethoxybenzoic acid | 35 | 46 |
| 4 | 3,4,5-Trimethoxybenzoic acid | 45 | 38 |

*Amount of radiation energy measured

In regard to Tables 2 to 4 it should be noted that they originate from different series of tests and that the absolute values from different tables are not directly comparable. Various parameters, such as the degree of drying, the drying time of the paper, inhomogeneities during application and the like can result in different absolute values for the loss in ink density. However, it can be seen clearly that, within the various test series, the stabilizers according to the invention reduce the loss in ink density appreciably.

TABLE 5

| SAM-PLE | STABILIZER | LOSS IN INK DENSITY (%) Food Black 2 at 45 kJ/cm$^2$* |
|---|---|---|
| 1 | — | 25 |
| 2 | 3,4-Dimethoxybenzoic acid | 16 |
| 3 | 2,5-Dimethoxybenzoic acid | 22 |
| 4 | 3,4-Dimethoxybenzenesulfonic acid | 22 |
| 5 | 3,4,5-Trimethoxyphthalic acid | 7 |
| 6 | 4,5-Dimethoxyphthalic acid | 18 |
| 7 | 2,3-Bis-(carboxymethoxy)benzoic acid | 15 |
| 8 | 3,4-Methylenedioxybenzoic acid | 16 |
| 9 | 2,3-Ethylenedioxybenzoic acid | 20 |
| 10 | 2,3-Isopropylidenedioxybenzoic acid | 12 |

*Amount of radiation energy measured

EXAMPLE 3

If the following compounds are employed as stabilizers in Examples 1 and 2, the loss in ink density can be reduced in a similar manner:

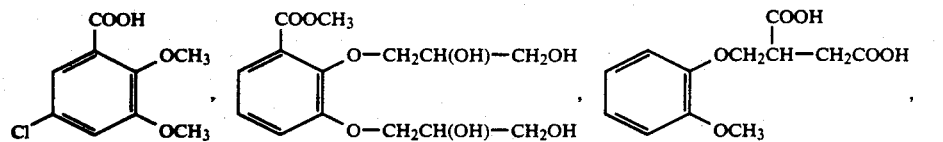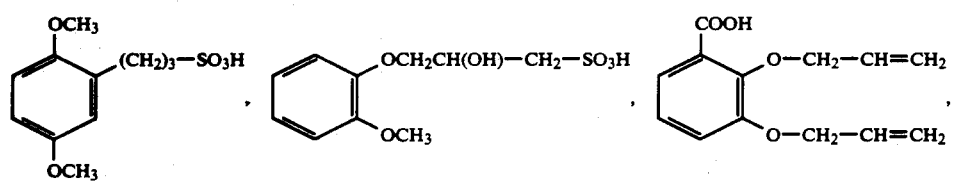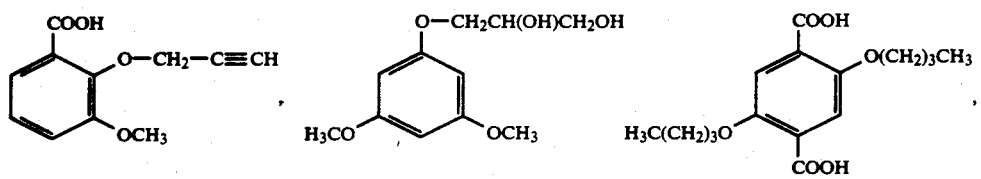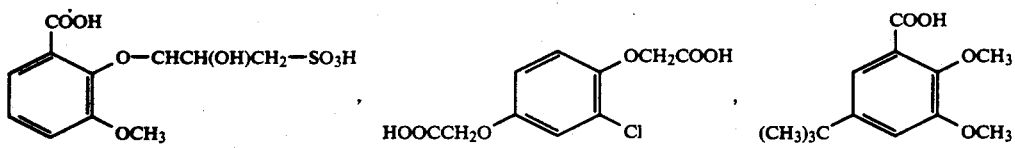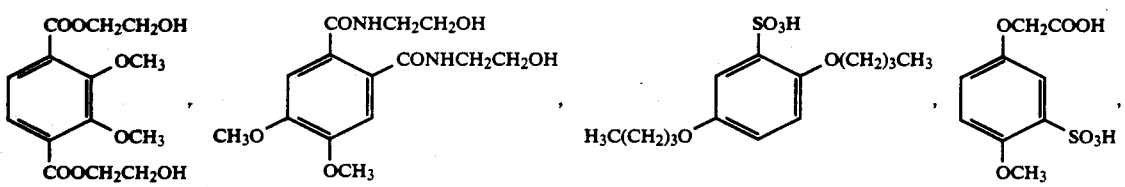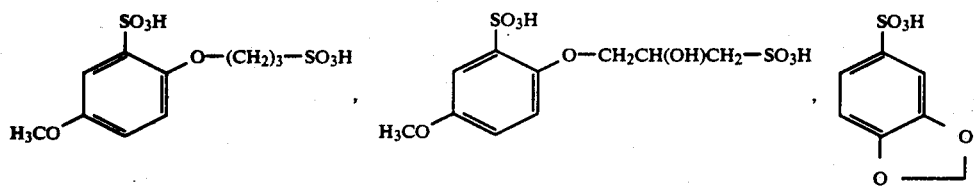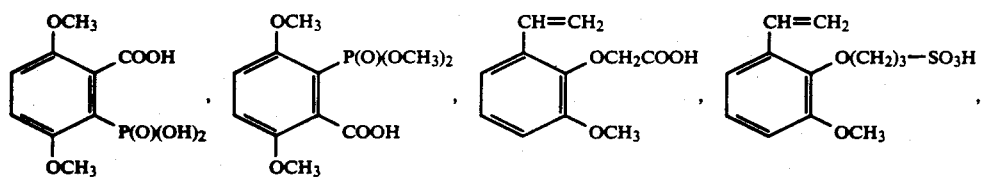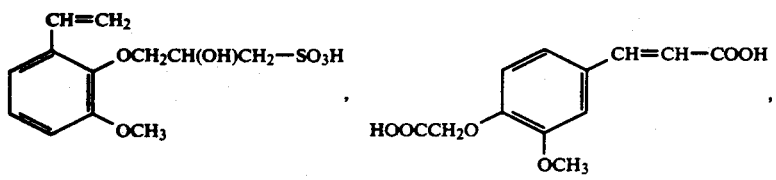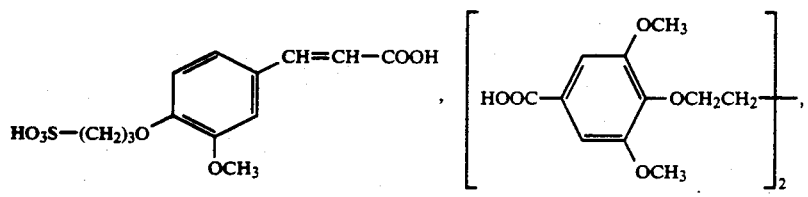

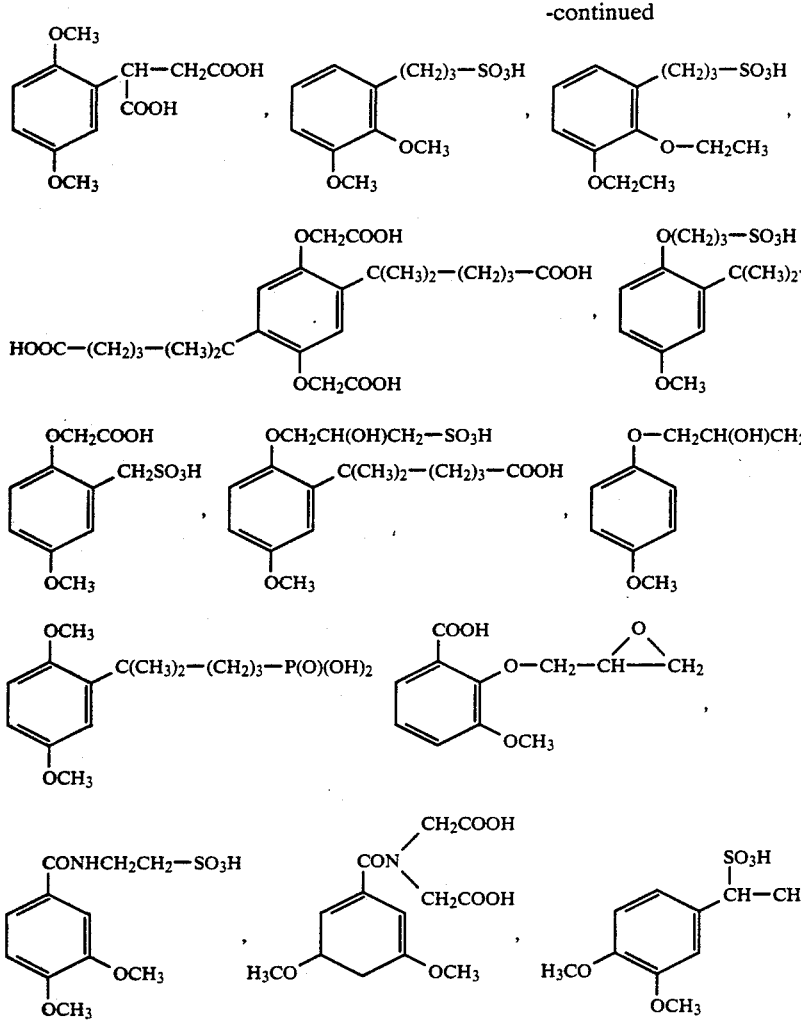

EXAMPLE 4

Ink jet printing paper is prepared as indicated in Example 2, with the exception that lithium hydroxide is used instead of sodium hydroxide solution for neutralizing the coating composition. The paper is printed with inks consisting of 4% of dye, 48% of diethylene glycol and 48% of water. The dyes used are C.I. Acid Yellow 23, C.I. Acid Red 35, C.I. Acid Blue 9 and C.I. Food Black: the results are collated in Tables 8 and 9.

TABLE 8

| | | LOSS IN INK DENSITY (%) | | |
|---|---|---|---|---|
| SAMPLE | STABILIZER | Acid Yellow 23 at 5 kJ/cm$^2$ | Acid Red 249 at 5 kJ/cm$^2$ | Acid Blue 9 at 5 kJ/cm$^2$ |
| 1 | — | 36 | 41 | 94 |
| 2 | 2-Carboxymethoxy-3-methoxybenzoic acid | 20 | 24 | 92 |
| 3 | 2,4-Dimethoxybenzene-sulfonic acid | 35 | 26 | 91 |

TABLE 9

| | | LOSS IN INK DENSITY (%) | | |
|---|---|---|---|---|
| SAMPLE | STABILIZER | Food Black 2 45 kJ/cm$^2$ | Acid Red 249 5 kJ/cm$^2$ | Acid Blue 9 5 kJ/cm$^2$ |
| 1 | — | 48 | 69 | 94 |
| 2 | 3'-(3,4-Dimethoxyphenyl)-propionic acid | 33 | 33 | 91 |

EXAMPLE 5

Coating compositions based on silica/polyvinyl alcohol are prepared with and without a stabilizer of the formula I. 0.2 g of a 10% solution of Invadin ® JFC (Ciba-Geigy AG) as a wetting agent, 15.8 g of water, 0.3 g of Polyfix 601 ® (Show a High Polymer Co.) as a mordant and 0.6 g of stabilizer of the formula I are added to 14.8 g portions of a 10% solution of polyvinyl alcohol (Riedel de Haen GmbH). The mixture is heated and stirred until the stabilizer has dissolved. 2.0 g of silica (type 244, W. R. Grace and Co.) are then added Red 227, Acid Blue 9, Direct Blue 86, Direct Blue 199 and Food Black 2. As described in Example 1, the paper is printed with these inks and the fastness to light of the inks is then tested. The results can be seen in Table 10.

TABLE 10

| | | LOSS IN INK DENSITY (%) | | | | | | | |
|---|---|---|---|---|---|---|---|---|---|
| | | Acid Yellow 23 | Acid Red 35 | Acid Red 249 | Direct Red 227 | Acid Blue 9 | Direct Blue 86 | Direct Blue 199 | Food Black 2 |
| | | | | | after | | | | |
| SAMPLE | STABILIZER | 15 | 5 | 15 | 15 kJ/cm$^2$ Atlas irradiation | 5 | 45 | 45 | 45 |
| 1 | — | 77 | 70 | 80 | 58 | 93 | 24 | 8 | 25 |
| 2 | 2,3-Dimethoxybenzoic acid | 38 | 48 | 41 | 34 | 89 | 22 | 6 | 17 |
| 3 | 3,4,5-Trimethoxybenzoic acid | 15 | 3 | 72 | 18 | 78 | 12 | 5 | 14 | and are dispersed with ultrasonic sound. The coating composition is filtered through a polyester sieve of mesh width 24 μm and its pH is adjusted to a value of 7.0 by adding lithium hydroxide. The coating composition is applied by means of a wire spiral to polyethylene-coated paper, and is dried. The paper prepared in this way has a layer coating of 8 g/m$^2$ or 1 g/m$^2$ of stabilizer. Inks consisting of 4% of dye, 48% of diethylene glycol and 48% of water are then prepared. The dyes used are Acid Yellow 23, Acid Red 35, Acid Red 249, Direct

EXAMPLE 6

In accordance with Example 2, ink jet printing paper containing compounds of the formula I is prepared as described there and is printed and tested for fastness to light. The inks used, which are prepared as in Example 2, contain the dyes Acid Yellow 23, Acid Red 249, Direct Red 227 and Acid Blue 9. The results are collated in Tables 11 to 14.

TABLE 11

| | | LOSS IN INK DENSITY (%) after 10 kJ/cm$^2$ | | |
|---|---|---|---|---|
| SAMPLE | STABILIZER | Acid Yellow 23 | Acid Red 249 | Direct Red 227 |
| 1 | — | 58 | 60 | 58 |
| 2 | 2,5-Dimethoxybenzene-1,4-disulfonic acid | 37 | 45 | 43 |
| 3 | 4,6-Dimethoxybenzene-1,3-disulfonic acid | 42 | 54 | 49 |
| 4 | 2,5-Di-n-butoxybenzenesulfonic acid | 43 | 41 | 52 |
| 5 | 4-Carboxymethoxy-3-methoxybenzoic acid | 26 | 48 | 31 |
| 6 | 2,3-Diethoxybenzoic acid | 43 | 38 | 47 |
| 7 | 2,3-Diallyloxybenzoic acid | 42 | 41 | 36 |
| 8 | 2,3-Di-n-butoxybenzoic acid | 49 | 45 | 50 |
| 9 | 3-Methoxy-2-propargyloxybenzoic acid | 45 | 46 | 46 |
| 10 | 2,2'-(ethylene-1,2-dioxydi)-3-methoxybenzoic acid | 34 | 35 | 51 |
| 11 | 2,3,5,6-Tetramethoxybenzoic acid | 43 | 48 | 50 |
| 12 | 2,3,5,6-Tetramethoxyphthalic acid | 40 | 55 | 46 |
| 13 | 2-Bromo-3,4,5-trimethoxybenzoic acid | 48 | 47 | 48 |
| 14 | 2,6-Dibromo-3,4,5-trimethoxybenzoic acid | 51 | 39 | 45 |
| 15 | Pentamethoxybenzoic acid | 57 | 42 | 48 |
| 16 | 3,4,5-Triethoxybenzoic acid | 44 | 31 | 43 |
| 17 | 3,4,5-Tri-n-butoxybenzoic acid | 50 | 41 | 51 |

TABLE 12

| SAMPLE | STABILIZER | LOSS IN INK DENSITY (%) of Acid Blue 9 after 2 kJ/cm$^2$ |
|---|---|---|
| 1 | — | 70 |
| 2 | 2,5-Dimethoxybenzene-1,4-disulfonic acid | 52 |
| 3 | 4,6-Dimethoxybenzene-1,3-disulfonic acid | 59 |
| 4 | 2,5-Di-n-butoxybenzenesulfonic acid | 61 |
| 5 | 2,3,5,6-Tetramethoxybenzoic acid | 52 |

TABLE 13

| | | LOSS IN INK DENSITY (%) after 10 kJ/cm$^2$ | |
|---|---|---|---|
| SAMPLE | STABILIZER | Acid Yellow 23 | Acid Red 249 |
| 1 | — | 58 | 60 |
| 2 | 2-Methoxy-6-methoxycarbonylphenoxyacetic acid | 55 | 55 |
| 3 | 4-Methoxy-6-methoxycarbonylphenoxyacetic acid | 45 | 60 |
| 4 | 2,4-Dimethoxybenzenesulfonic acid | 55 | 44 |
| 5 | 2-Carboxy-6-methoxyphenoxyacetic acid | 33 | 41 |
| 6 | 2-Acetoxy-5-methoxy-1,4-benzenebis-(5,5'-(5-methyl)-hexanoic acid | 48 | 53 |

TABLE 14

| SAMPLE | STABILIZER | LOSS IN INK DENSITY (%) of Direct Red 227 after 10 kJ/cm² |
|---|---|---|
| 1 | — | 58 |
| 2 | Resorcinol-O,O-diacetic acid | 41 |
| 3 | 2-Chlorohydroquinone-O,O-diacetic acid | 34 |

What is claimed is:

1. A recording material for ink jet printing comprising a carrier having a surface which can be printed on or a carrier coated on one side with a material which can be printed on, wherein said carrier or said coating contains as a stabilizer, at least one compound of the formula I

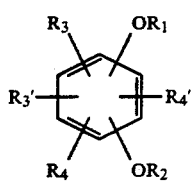
(I)

in which $R_1$ and $R_2$ independently of one another are $C_1-C_4$alkyl which is unsubstituted or substituted by one or two —OH, —COO$^\ominus$M$^\oplus$ and/or —SO$_3^\ominus$M$^\oplus$ groups, $C_3-C_5$alkenyl, $C_3-C_5$alkynyl,

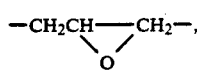

—CH$_2$CH(OH)CH$_2$—SO$_3^\ominus$M$^\oplus$, —CO-alkyl($C_1-C_4$) which is unsubstituted or substituted by —COOR$^o$ or —CO—N(R$_5$)(R$_6$) or, if OR$_1$ and OR$_2$ are in the ortho-position relative to one another, R$_1$ and R$_2$ together are $C_1-C_6$alkylene, M$^\oplus$ being H$^\oplus$, a monovalent, divalent or trivalent metal cation or a group (R$_{12}'$)N$^\oplus$(R$_{12}''$)(R$_{13}'$)(R$_{14}'$), wherein R$_{12}'$, R$_{12}''$, R$_{13}$ and R$_{14}$ independently of one another are H, $C_1-C_4$alkyl which is unsubstituted or substituted by 1 or 3 OH, $C_1-C_4$alkyl interrupted by O, allyl, cyclopentyl, cyclohexyl, phenyl, benzyl or tolyl, or R$_1$ is a group

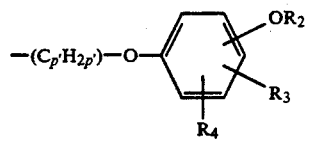

in which p' is a number from 2 to 6, R$_5$ and R$_6$ independently of one another are H or $C_1-C_4$alkyl which is unsubstituted or substituted by an OH, COOR$^o$, —COO$^\ominus$M$^\oplus$, SO$_3$R$^o$, SO$_3^\ominus$M$^\oplus$, P(O)(O$^\ominus$M$^\oplus$)$_2$ or P(O)(OR$^o$)$_2$ group, R$_3'$ and R$_4'$ independently of one another are H, $C_1-C_4$alkyl, OH or $C_1-C_4$alkoxy, R$_3$ and R$_4$ independently of one another are H, halogen, —OR$_7$, —COOR$^o$, —COO$^\ominus$M$^\oplus$, —OOC—R$_5$, —CO—N(R$_5$)(R$_6$), —(R$_5$)N—CO—R$_6$, —CO—R$_5$, —SO$_3^\ominus$M$^\oplus$, —SO$_2$N(R$_5$)(R$_6$), —P(OR$_5$)$_3$, —(O)P-(O$^\ominus$M$^\oplus$)$_2$, —(O)P—(OR$^o$)$_2$, $C_1-C_8$alkyl which is unsubstituted or substituted by 1 to 7 —OR$_5$ or —OOC—R$_5$ groups, by 1 or 2 —COOR$^o$, —COO$^\ominus$M$^\oplus$, or —CO—N(R$_5$)(R$_6$) groups or by one or two —SO$_3^\ominus$M$^\oplus$, —SO$_2$N(R$_5$)(R$_6$) or —(O)P—(OR$^o$)$_2$ or —(O)P(O$^\ominus$M$^\oplus$)$_2$ groups, where M$^\oplus$, R$_5$ and R$_6$ are as defined above, or $C_5-C_6$cycloalkyl or allyl, R$^o$ being $C_1-C_4$alkyl which is unsubstituted or substituted by an —OH group or —(CH$_2$CH$_2$O)$_r$—H in which r is 1 to 12, and R$_7$ being $C_1-C_4$alkyl or —CO-alkyl($C_1-C_4$) each of which is unsubstituted or substituted by 1 or 2 —OH groups or R$_3$ and R$_4$ independently of one another are one of the groups of the formulae II–IV

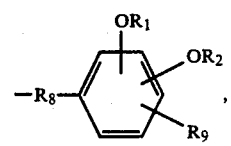
(II)

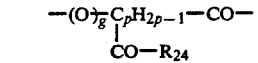
(III)

$$\begin{array}{c} R_{21} \quad R_{22} \\ \diagup \\ -R_{15}-R_{16} \quad S(O)_t \\ \diagdown \\ R_{21} \quad R_{22} \end{array} \quad (IV)$$

in which R$_8$ is a direct bond or methylene, R$_9$ is H, $C_1-C_8$alkyl, —COO$^\ominus$M$^\oplus$ or —SO$_3^\ominus$M$^\oplus$, where M$^\oplus$, R$_1$ and R$_2$ are as defined above, R$_{15}$ is —CO—, —(O)-$_g$—C$_p$H$_{2p}$—CO—, —OOC—C$_p$H$_{2p}$—, —COO—C$_p$H$_{2p}$—, —O—CH$_2$CH(OH)—CH$_2$— or $$\begin{array}{c} -(O)_g^- C_p H_{2p-1} - CO - \\ | \\ CO - R_{24} \end{array}$$

in which g is 0 or 1 and p is 1 to 6 and R$_{24}$ is —OR$_5$, —N(R$_5$)(R$_6$) or a group

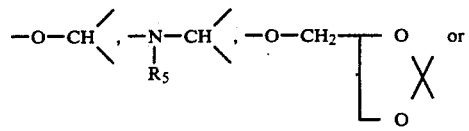

and R$_{16}$ is one of the following radicals:

$$-O-CH\diagup,\ -N-CH\diagup,\ -O-CH_2-\!\!\!\Bigg[\!\!\!\begin{array}{c} O \\ \diagup \\ \diagdown \\ O \end{array} \text{ or}$$

-continued

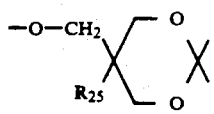

in which $R_{25}$ is H or $C_1$-$C_4$alkyl, $R_{17}$ is H, $C_1$-$C_4$alkyl which is unsubstituted or substituted by an —OH group, —$CH_2$—CH(OH)—$CH_2$—OH, $C_1$-$C_4$-alkoxy, —OH, —CO-alkyl($C_1$-$C_4$), —COCH=$CH_2$, allyl, benzyl or a group

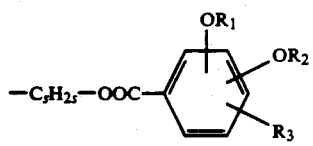

in which s is the number 2 or 3, t is a number from 0 to 2 and $R_{21}$ and $R_{22}$ independently of one another are H, $C_1$-$C_4$alkyl or phenyl.

2. A recording material according to claim 1, containing, as a stabilizer, at least one compound of the formula I'

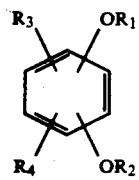

in which $R_1$ and $R_2$ independently of one another are $C_1$-$C_4$alkyl which is unsubstituted or substituted by one or 2 —OH, —COO$^\ominus$M$^\oplus$ and/or —SO$_3\ominus$M$^\oplus$ groups, —CH$_2$CH(OH)CH$_2$—SO$_3\ominus$M$^\oplus$ or —CO-alkyl(-$C_1$-$C_4$), in which M$^\oplus$ is H$^\oplus$, a monovalent, divalent or trivalent metal cation or a group ($R_{12}'$)N$^\oplus$($R_{12}''$)($R_{13}'$)($R_{14}'$), $R_5$ and $R_6$ independently of one another are H or $C_1$-$C_4$alkyl which is unsubstituted or substituted by one OH group, $R_3$ and $R_4$ independently of one another are H, halogen, —OR$_7$, —COOR$^o$, —COO$^\ominus$M$^\oplus$, —OOC—R$_5$, —CO—N(R$_5$)(R$_6$), —(R$_5$)N—CO—R$_6$, —CO—R$_5$, —SO$_3\ominus$M$^\oplus$, —SO$_2$N(R$_5$)(R$_6$), —P(OR$_5$)$_3$, —(O)P(OR$^o$)$_2$, —(O)P(O$\ominus$M$^\oplus$)$_2$, $C_1$-$C_8$alkyl which is unsubstituted or substituted by 1 to 7 —OR$_5$ or —OOC—R$_5$ groups, by 1 or 2 —COOR$^o$, COO$^\ominus$M$^\oplus$ or —CO—N(R$_5$)(R$_6$) groups or by an —SO$_3\ominus$M$^\oplus$, SO$_2$N(R$_5$)(R$_6$) or —(O)P(O$\ominus$M$^\oplus$)$_2$, or —(O)P(OR$^o$)$_2$ group, where M$^\oplus$, R$_5$ and R$_6$ are as defined above, R$^o$ being $C_1$-$C_4$alkyl which is unsubstituted or substituted by an —OH group, or is —(CH$_2$CH$_2$O)$_r$—H in which r is 1 to 12, R$_7$ is $C_1$-$C_4$alkyl which is unsubstituted or substituted by 1 or 2 —OH groups, or R$_3$ and R$_4$ independently of one another are one of the groups of the formulae

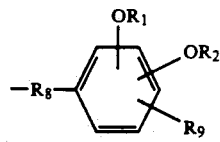

in which R$_8$ is a direct bond or methylene, R$_9$ is H, $C_1$-$C_8$alkyl, COO$^\ominus$M$^\oplus$ or —SO$_3\ominus$M$^\oplus$, and R$_1$ and R$_2$ are as defined above.

3. A recording material according to claim 1, wherein R$_1$ and R$_2$ independently of one another are $C_1$-$C_4$alkyl, allyl, $C_2$-$C_4$hydroxyalkyl, —$C_1$-$C_4$alkyl—COO$^\ominus$M$^\oplus$, —CH$_2$CH(OH)CH$_2$—SO$_3\ominus$M$^\oplus$ or —CO-alkyl($C_1$-$C_4$) or wherein R$_1$ is a group of the formula

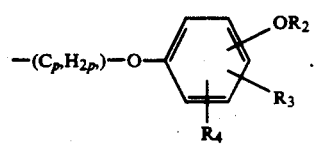

4. A recording material according to claim 3, wherein R$_1$ and R$_2$ independently of one another are methyl, ethyl, allyl, —CH$_2$CH$_2$—OH, —CH$_2$COO$^\ominus$M$^\oplus$, —CH$_2$CH(OH)CH$_3$ or —CH$_2$CH(OH)CH$_2$(OH).

5. A recording material according to claim 1, wherein R$_3$ and R$_4$ independently of one another are H, halogen, —OR$_7$, —COOR$^o$, —COO$^\ominus$M$^\oplus$, —CO—N(R$_5$)(R$_6$), —SO$_3\ominus$M$^\oplus$, —SO$_2$N(R$_5$)(R$_6$), allyl, —$C_1$-$C_8$alkyl which is unsubstituted or substituted by —COO$^\ominus$M$^\oplus$.

6. A recording material according to claim 1, wherein R$_3$ and/or R$_4$ are the radical —OR$_7$ in which R$_7$ is $C_1$-$C_4$alkyl, $C_2$-$C_4$hydroxyalkyl or —CH$_2$—CH(OH)CH$_2$—OH.

7. A recording material according to claim 1, wherein R$_1$ and R$_2$ are CH$_3$ and R$_3$ is —COO$^\ominus$M$^\oplus$ and R$_9$ is methoxy.

8. A recording material according to claims 1 or 2, wherein R$_1$ and R$_2$ independently of one another are $C_1$-$C_4$alkyl or $C_1$-$C_4$alkyl which is substituted by —COO$^\ominus$H$^\oplus$, or R$_1$ and R$_2$ together are $C_1$-$C_4$alkylene, R$_3$ and R$_4$ independently of one another are H, —COO$^\ominus$M$^\oplus$, $C_1$-$C_4$alkoxy, $C_1$-$C_4$-alkyl, COO$^\ominus$M$^\oplus$, $C_1$-$C_4$alkyl or SO$_3\ominus$M$^\oplus$ and R$_3'$ and R$_4'$ independently of one another are H or $C_1$-$C_4$alkoxy.

9. A recording material according to claim 1, further comprising a UV absorber in the material coated on the carrier.

10. A recording material according to claim 1, further comprising a cationic polymer or a cationic wetting agent in the material coated on the carrier.

11. A recording material according to claim 1, further comprising SiO$_2$ and polyvinylalcohol in the material coated on the carrier.

12. A recording material according to claim 1, wherein said carrier contains cellulose fibers or textile fibers.

13. A recording material according to claim 1, further comprising a UV absorber from the 2-hydroxyphenylbenzotriazole class in the material coated on the carrier.

* * * * *